United States Patent Office 3,004,555
Patented Oct. 17, 1961

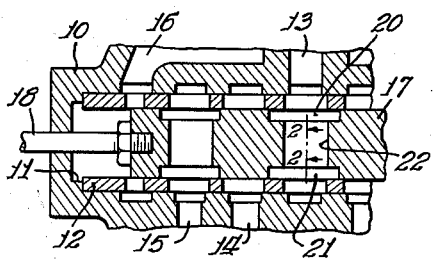

3,004,555
VALVES
Frederick C. Haberland, Cleveland, Ohio, assignor to Borg-Warner Corporation, Chicago, Ill., a corporation of Illinois
Filed Feb. 19, 1957, Ser. No. 641,139
4 Claims. (Cl. 137—620)

This invention relates in general to valves and in particular to a new and improved hydraulic valve of the the slidable spool type.

A general object of this invention is to provide a new and improved spool type slidable valve particularly useful in high pressure hydraulic systems where sensitivity and/or space requirements are important.

One defect of prior spool type slidable valve is that they had a tendency to stick or become immovable particularly when high pressure hydraulic fluid was used. This tendency to stick necessitated high initial forces to be applied to either end of the spool valve. This defect has limited the uses of spool type valves particularly in high pressure systems where sensitivity and rapid change are important factors.

Another defect in prior art valves of the slidable spool type is the fact that where a number of ports or passages are required in a system it has been necessary to form a valve that is long and unwieldy, thus requiring considerable space as well as considerable weight. This defect has limited the use of spool type valves where space is at a premium or weight is an important factor. This defect, as will be apparent, is caused by the manner in which the prior art valves were formed, namely, by forming a plurality of lands interspaced with a plurality of reduced portions which established interconnection between a plurality of ports to accomplish the change of flow or reversal of flow of fluid to and from the valve as the case may be. The larger the number of ports required, the larger the number of lands and reduced portions therebetween and the longer the valve. Attempts to reduce the space between the lands were of little value.

It is still another and particular object of my invention to provide a valve requiring substantially less initial force to move the valve than that required in prior art valves making my invention useful particularly in high pressure systems and to reduce the overall length of such valves so as to be usable in any high pressure system and particularly those requiring small space.

I propose to accomplish the above general and particular objects of my invention by the elimination of the lands and reduced portions as they are now known and as normally found in the prior art valves and by so constructing and arranging the slidable spool element of the spool valve assembly with relatively narrow, relatively shallow indentations or cavities connected for fluid intercommunication by relatively small passageways formed in the spool. In some applications, I have found that the cavities or indentations themselves can be eliminated by merely providing the spool itself with a plurality of intercommunicating passages so constructed and arranged with respect to the ports so as to provide fluid pressure communication as required.

Other objects and advantages of my invention will be apparent from the following detailed description taken in conjunction with the drawings wherein:

FIG. 1 is a fragmentary, axial, sectional view of a spool type valve assembly having a spool constructed in accordance with the teachings of my invention;

FIG. 2 is a view of the spool shown in FIG. 1 taken along lines 2—2 of FIG. 1 and looking in the direction of the arrows showing to advantage the intercommunicating fluid pressure passageway between the indentation or cavities formed in the spool;

FIG. 3 is a plan view of one of the indentations or cavities formed in the spool shown in FIG. 1;

FIG. 4 is a plan view of another embodiment of a spool constructed in accordance with the teachings of my invention and showing the cavities or indentations therein;

FIG. 5 is a cross-sectional view of the spool along line 5—5 of FIG. 4, looking in the direction of the arrows and showing to advantage the curved bottoms and intercommunicating fluid pressure passages formed therein;

FIG. 6 is still another view of the indentations and passageways formed in the spool of FIGS. 4 and 5;

FIG. 7 is a plan view of still another embodiment of our invention showing to advantage another type of cavity or indentation formed in the spool;

FIG. 8 is a cross-sectional view of the spool taken along line 8—8 of FIG. 7, looking in the direction of the arrows, and FIG. 7 showing to advantage the shape of the cavity or indentations with an intercommunicating fluid pressure passage;

FIG. 9 is still another view of the valve shown in FIG. 7 showing to advantage the cavities and indentations with the intercommunicating passage;

FIG. 10 is another embodiment of my invention showing to advantage still another form of cavities or indentations in the spool;

FIG. 11 is a cross sectional view of the spool taken along line 11—11 of FIG. 10 and looking in the direction of the arrows;

FIG. 12 is still another view of the spool shown in FIG. 10 and showing to advantage the cavities or indentations and the intercommunicating passage;

FIG. 13 is a cross sectional view of still another embodiment of our invention showing the intercommunicating passageways formed in the spool;

FIG. 14 is another view of a spool showing still another form of cavity within the purview of my invention;

FIG. 15 is still another view of still another embodiment of my invention.

Referring now to the drawings, and in particular to FIGS. 1, 2 and 3 thereof, there is shown a valve housing 10 having a cylindrical, axial, elongated body bore 11 in which a cylinder sleeve-like member 12 is received. The body 10 is provided with an inlet high pressure port 13 and high pressure ports (14 only being fully shown), a return port 15 and an outlet port 16. The sleeve 12 is provided with corresponding ports so as to provide fluid pressure communication between the various ports in the housing according to the position of the slidable spool 17 as can be seen. Obviously, sliding movement to the right or to the left of the spool 17 by rod means 18 suitably affixed thereto will provide communication between the inlet port and the various pressure inlet and outlet ports as can be understood.

The spool 17 is provided with a plurality of relatively narrow, relatively shallow pockets sometimes referred to hereinafter as indentations or cavities in the sealing periphery of the spool such as cavities 20 and 21, shown in FIG. 2, which are in fluid pressure communication with each other through a radially extending passage or aperture 22. Cavity 20, with its flat bottom 23, terminates at radially extending ends 24 and 25, which form the sides of a rectangle together with edges 26 and 27, and is formed by cutting away a portion of the circumference of the spool. It is to be noted that these cavities are of a width less than the diameter of the sealing periphery of the spool, and since all of the cavities of the spool may be identical, only the description of cavity 20 is deemed necessary. The sealing periphery of the spool being defined by the outer surface thereof which is adapted to engage the inner peripheral surface of the sleeve in sealing relation, though axially movable relative thereto.

Turning now to FIGS. 4, 5 and 6, there is shown another embodiment of the invention wherein the cavities are formed similar to those shown in FIGS. 2 and 3 except that the bottom 23a is provided with a slight curvature. The curvature of the bottom 23a is mainly to facilitate its manufacture since it will perform the same function as the cavity 20 as shown in FIGS. 2 and 3. For convenience the letter "a" is affixed to numerals denoting similar parts on the cavity 20a which correspond to similar parts on the cavity 20 and no further explanation is deemed necessary herein.

FIGS. 7, 8 and 9 show still another form of cavity, which can be conveniently cut into a spool, having a curved bottom 23b and a pair of sides 26b and 27b which meet each other to form an ellipse, thus eliminating the radial ends of the cavity. Cavity 20b will perform the same function as the cavities shown in connection with FIGS. 2 through 6 and the letter (b) is affixed to similar parts described in connection with FIGS. 2 and 3. These parts function similarly and may be selected at the convenience of the user for the particular purpose involved and/or the type of tool deemed necessary.

FIGS. 10, 11 and 12 show still another cavity 20c with a flat bottom 23c conveniently cut in the spool eliminating the flat end portions and forming an ellipse. While the tool used to cut this type of cavity may differ from that used in connection with the formation of cavity 20b of FIGS. 7, 8 and 9, the function and purpose are the same.

FIG. 13 shows still another spool having radially extending passages 30 and 31 which connect with each other at right angles as another example of a type of spool valve within the scope of this invention. Such passages may perform the function of the cavities above described wherever necessary and desirable. It can be seen that such passages need not be extended axially a large distance in the spool to provide a spool valve function if the ports in the valve body were correspondingly arranged permitting a foreshortening of the spool assembly. In many applications this type of arrangement may be found quite desirable.

FIG. 14 shows still another type of spool valve within the scope of this invention wherein the cavities may be formed merely by intercommunicating slots such as elongated slot 32. Obviously, such slots as well as the passage as shown in FIG. 13 may communicate normal to each other to shorten the valve.

FIG. 15 shows a round hole 33 which itself may be used as a cavity or pocket dependent upon the peculiar conditions of use. Obviously, such passages may communicate normal to each other to shorten the valve as explained in connection with FIGS. 13 and 14.

While I have shown a number of cavities connected with radially extending passages, such as passage 22 of FIGS. 2 and 3, obviously any number of passages may be formed in the spool in an axial direction to provide intercommunication with any number of the cavities. Also, it is to be understood that if desirable, any of the cavities and/or passages shown in the drawings could be intermixed with any other type of passage or cavity in any one spool, those shown being merely an indication of the number of types and combinations that may be useful depending upon machining practice or the conditions under which the valve may be designed to operate.

From the above description it can be seen that my new type of spool valve assembly facilitates its use with high fluid pressure and reduces the normal space requirements of such valves by the utilization of pockets, or if preferred, passageways or slots, in the slidable spool which cooperate with corresponding ports in a valve sleeve or valve housing to direct and/or change the flow of fluid to the various ports upon movement of the spool. My valve differs from known spool valves in that I have eliminated the lands and reduced portions therebetween and have substituted therefor the pockets and passageways above mentioned.

One theory of the reduction in valve sticking with my spool type valve is as follows. Under high pressure, the prior art spool type valve, while ostensibly pressure balanced in the cavities between the lands, actually permitted leakage to occur past the lands toward cavities or zones of lesser pressure. This leakage, ostensibly, would tend to form a ring of fluid lubricating pressure between the lands and the inner peripheries of the cylindrical cavities. Actually, however, once the leakage occurs at any one point or area in the periphery of the land, the valve is urged in the diametrically opposite direction against the cylindrical cavity wall. All leakage past the lands will be located on one side of the valve, and the valve will stick in direct proportion to the fluid pressure. It is to be noted that I have reduced the area under pressure in my valve by minimizing the size of the pockets to be filled with high pressure, thus making available more of the valve body for centering it in the cylindrical cavity in which the spool slides. Thus centered, any leakage that occurs from the high pressure zones to zones of lesser pressure is not as apt to force the valve against one side or the other of the cavity wall and will provide a ring or seal of fluid lubricant for the spool.

While the various parts herein have been described as upper or lower or in a right or left position, such description refers only to the relative position of the parts as shown in the drawings and is not intended to be a limitation of the invention; it being understood that the appended claims should be construed as broadly as the prior art will permit.

I claim:

1. A spool type valve assembly comprising; a housing with inlet, outlet, return and pressure ports and a valve cavity formed therein; a spool disposed in said valve cavity for sliding relationship therein having a plurality of means so constructed and arranged for selectively connecting one or more of said ports for the communication of fluid pressure therebetween; said means comprising openings formed in the sealing periphery of said spool of a width less than the diameter of said sealing periphery of said spool and transverse passages interconnecting pairs of said openings to equalize the pressure on opposite sides of said spool when each of said pairs is in communication with only one of said ports.

2. In a spool type valve assembly; a housing with inlet, outlet, return and pressure ports and a valve cavity formed therein; a spool disposed in said valve cavity for sliding relationship therein; the improvement comprising means on said spool so constructed and arranged for selectively connecting one or more of said ports for the communication of fluid pressure therebetween; said means comprising openings formed in the sealing periphery of said spool of a width less than the diameter of said sealing periphery of said spool and transverse apertures interconnecting pairs of said openings to equalize the pressure on opposite sides of said spool when each of said pairs is in communication with only one of said ports.

3. In a spool type valve assembly; a housing with inlet, outlet, return and pressure ports and a valve cavity formed therein; a spool disposed in said valve cavity for sliding relationship therein; the improvement comprising means on said spool so constructed and arranged for selectively connecting one or more of said ports for the communication of fluid pressure therebetween; said means comprising oppositely disposed relatively narrow, relatively shallow cavities formed in the sealing periphery of said spool and transverse passages interconnecting pairs of said cavities to equalize the pressure on opposite sides of said spool when each of said oppositely disposed relatively narrow shallow cavities are in communication with only one of said ports.

4. A spool valve comprising a housing provided with a valve cavity therein and having a plurality of ports connecting said valve cavity with the exterior of said housing, and a spool disposed in said valve cavity for sliding relationship therein for selectively connecting one or more of said ports for the communication of fluid pressure therebetween, said oppositely disposed spool being provided with pairs of narrow shallow indentations having a width less than said spool formed in the sealing periphery of said spool, each indentation being so positioned as to permit registry thereof with one or more of said ports, said spool being further provided with transverse apertures interconnecting pairs of said indentations to equalize the pressure on opposite sides of said spool when each pair of narrow shallow indentations is in communication with only one of said ports.

References Cited in the file of this patent

UNITED STATES PATENTS

| | | |
|---|---|---|
| 59,096 | Trent | Oct. 23, 1866 |
| 1,775,856 | Hauser | Sept. 16, 1930 |
| 1,872,626 | Ernst et al. | Aug. 16, 1932 |
| 2,421,318 | De Lancey | May 27, 1947 |
| 2,509,953 | Baldwin | May 30, 1950 |
| 2,593,558 | Harbaugh | Apr. 22, 1952 |
| 2,742,056 | Williams | Apr. 17, 1956 |
| 2,766,847 | Harter | Oct. 16, 1956 |
| 2,774,337 | Geyer | Dec. 18, 1956 |
| 2,782,802 | Sassen | Feb. 26, 1957 |
| 2,796,081 | Dannevig et al. | June 18, 1957 |
| 2,798,460 | Mathys | July 9, 1957 |

FOREIGN PATENTS

| | | |
|---|---|---|
| 487,123 | France | Mar. 16, 1918 |
| 371,603 | Great Britain | Apr. 28, 1932 |